United States Patent [19]

Briggs

[11] 4,252,373
[45] Feb. 24, 1981

[54] AUTOMATICALLY COLLAPSIBLE TRAILER HITCH FOR DUMP TRUCKS

[76] Inventor: Stanley E. Briggs, 200 Circle Dr., Beloit, Kans. 67420

[21] Appl. No.: 72,585

[22] Filed: Sep. 5, 1979

[51] Int. Cl.³ .......................... B60P 1/04; B60D 1/14
[52] U.S. Cl. ............................. 298/17 R; 280/491 B
[58] Field of Search .......... 280/491 R, 491 B, 491 D; 298/1 R, 17 R

[56] References Cited

U.S. PATENT DOCUMENTS

| | | | |
|---|---|---|---|
| 2,799,531 | 7/1957 | Vine | 298/17 R |
| 3,298,744 | 1/1967 | Keim | 298/17 R |
| 3,545,791 | 12/1970 | Lugash | 280/491 |
| 3,565,461 | 2/1971 | Jones | 280/491 |
| 3,612,576 | 10/1971 | Marler | 280/478 B |
| 3,638,811 | 2/1972 | Robinson | 280/491 B |
| 3,666,121 | 5/1972 | Denner | 280/491 D |
| 3,860,267 | 1/1975 | Lyons | 280/478 B |
| 4,026,590 | 5/1977 | Holm | 298/1 R |
| 4,163,568 | 8/1979 | McCumber | 280/491 B |

Primary Examiner—John P. Silverstrim
Attorney, Agent, or Firm—Fishburn, Gold and Litman

[57] ABSTRACT

A collapsible trailer hitch to be used on a truck which has a pivoting platform for dumping, includes a Y-member attached to the chassis of the truck and a support member for the trailer tongue secured to a rotating bar journaled to the pivoting platform of the truck by mounting brackets. The support member is attached to the Y-member by means of connecting links which are pivoted at both ends. The hitch collapses and restores automatically upon pivoting of the platform.

8 Claims, 9 Drawing Figures

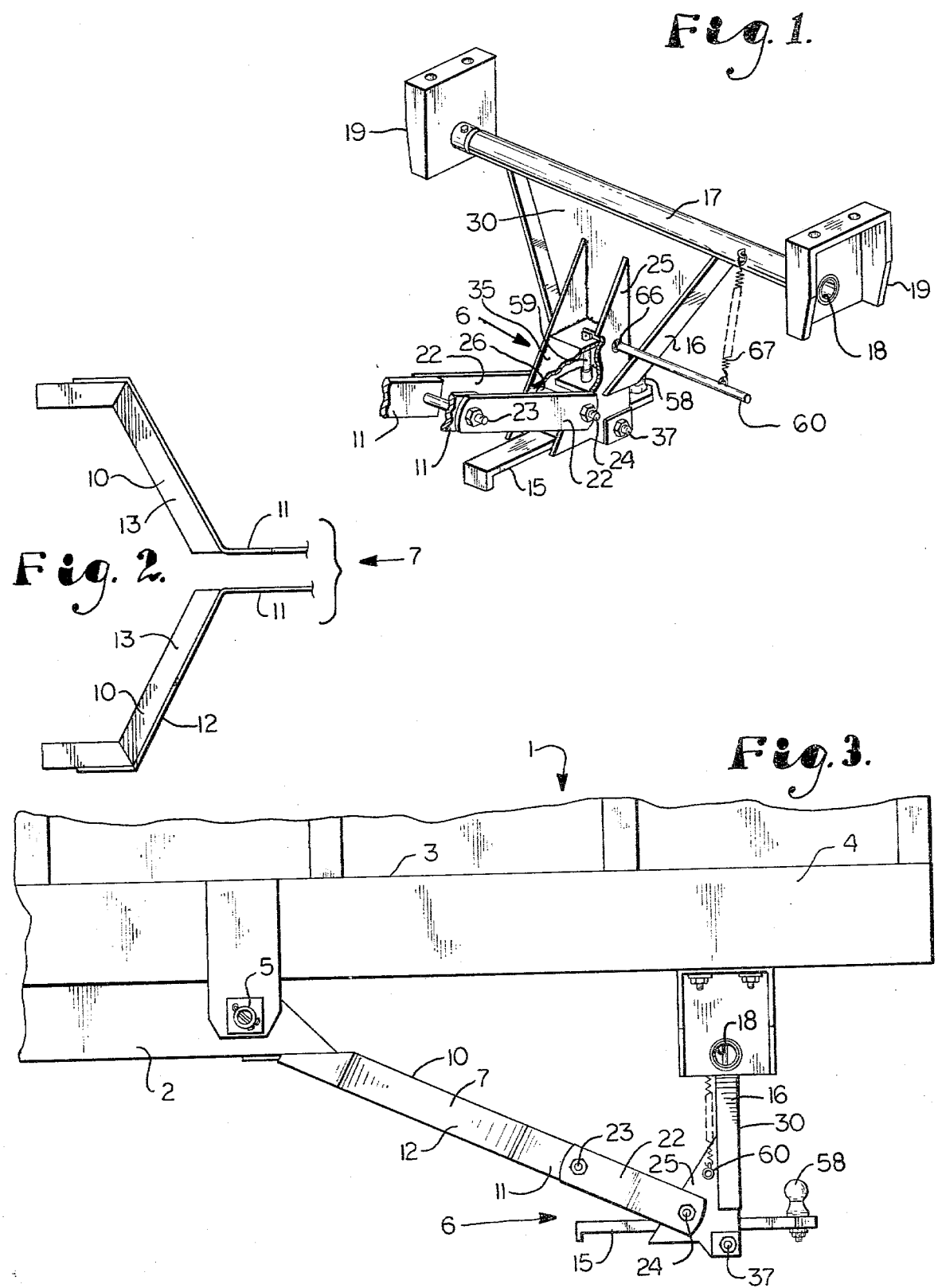

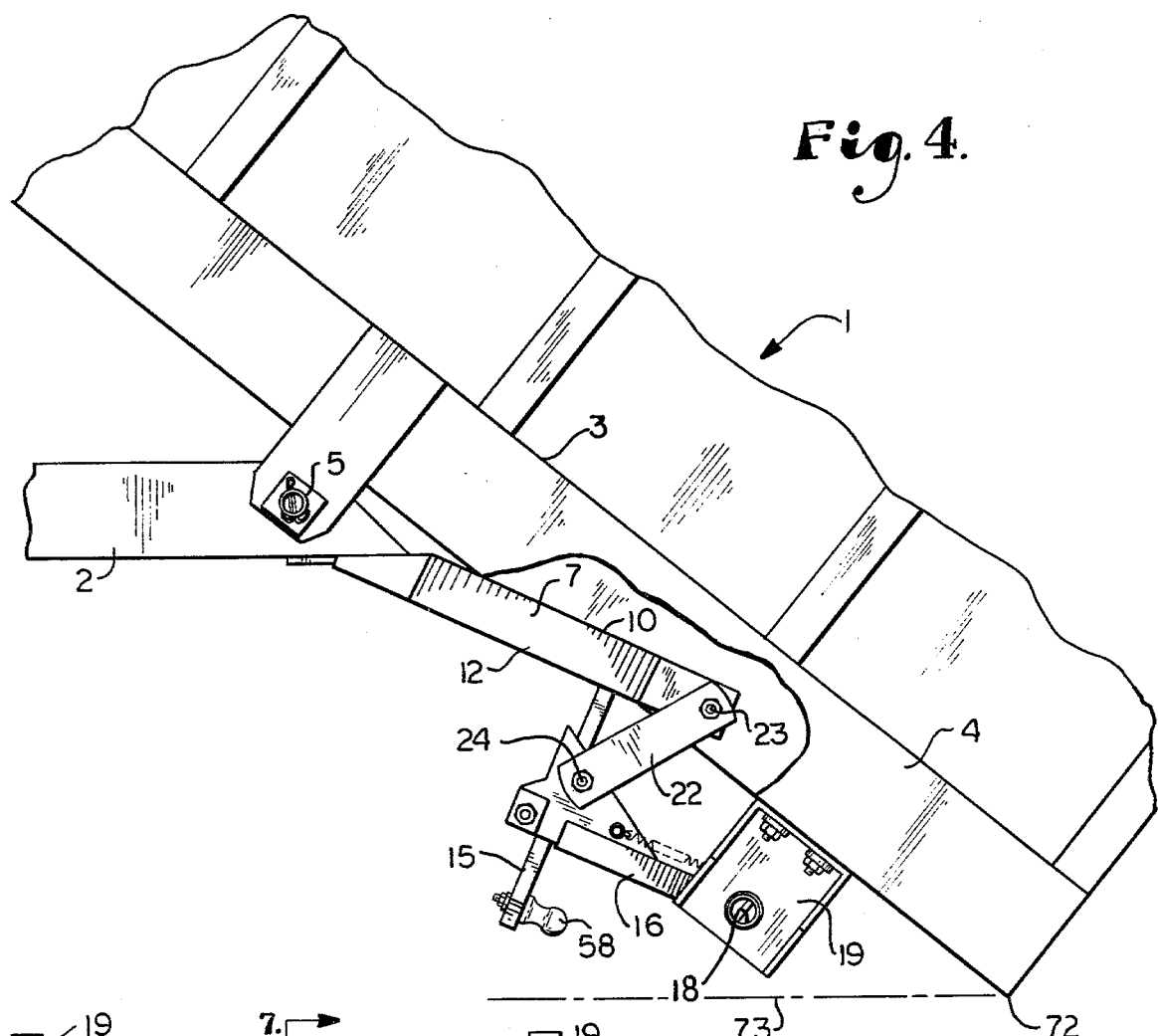
Fig. 4.
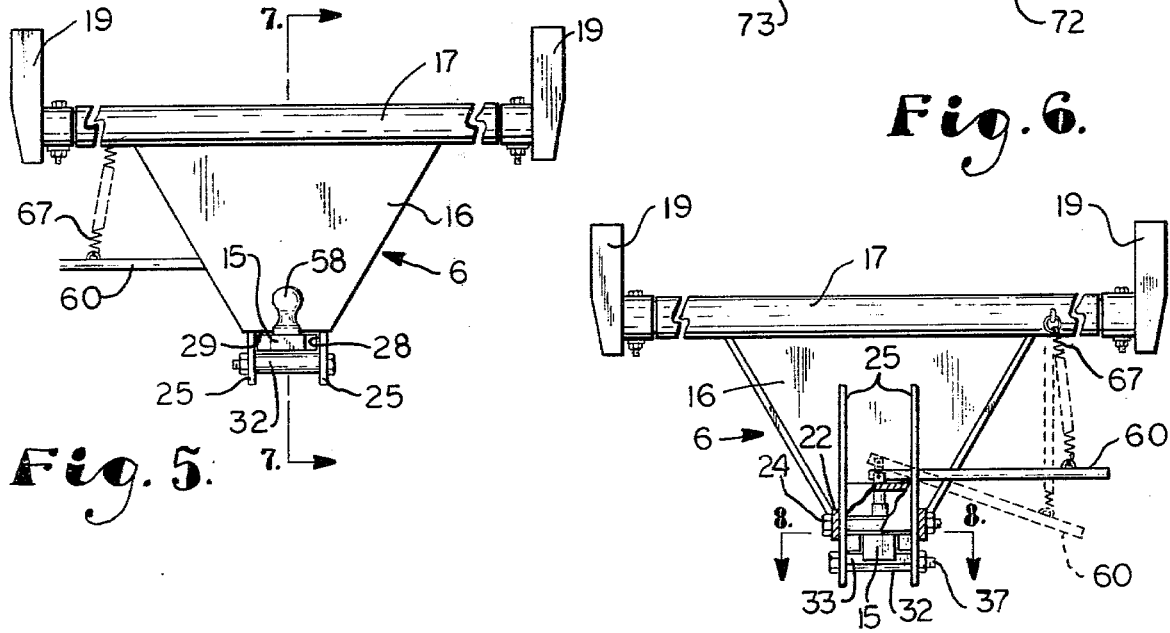
Fig. 5.
Fig. 6.

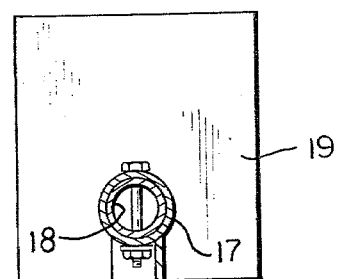
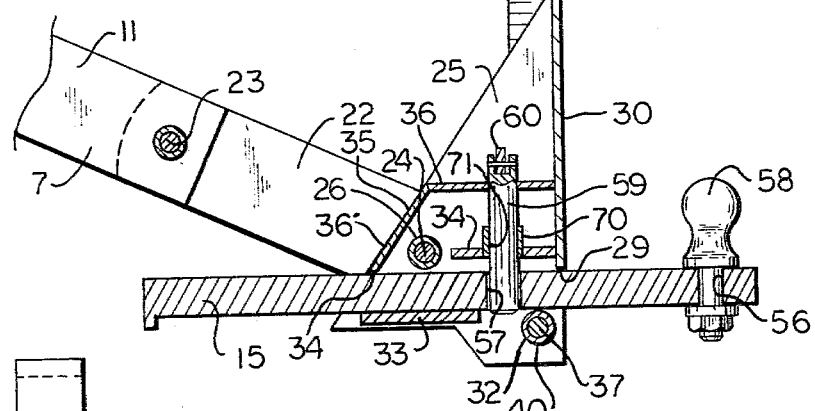
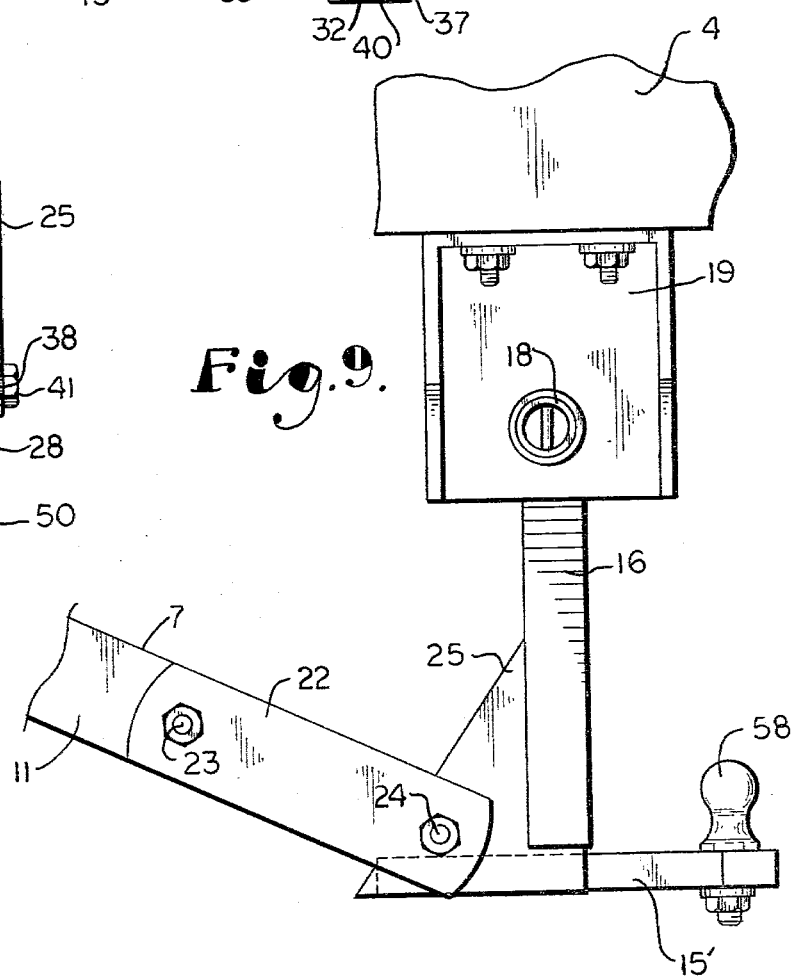

AUTOMATICALLY COLLAPSIBLE TRAILER HITCH FOR DUMP TRUCKS

Field of the Invention

This invention relates to hitches and more particularly to an automatically collapsible trailer hitch for trucks which have rearwardly pivoting platforms, such as dump trucks.

Description of the Prior Art

It is often desirable to tow a trailer behind a dump truck. The trailer hitch for connection of the trailer to the truck must be connected to the frame of the truck. It is necessary that the hitch be so configured that when the dump bed is tilted for dumping (with the trailer unhitched) the hitch neither interferes therewith nor is moved into ground contact by the action of the bed. Since dump trucks are often required to discharge their loads while parked on irregular surfaces, it is desirable for the hitch to have as much ground clearance as possible when the dump bed is tilted in order to avoid damage thereto by contact with the ground or objects thereon. In addition, when the dump bed is in a non-tilted position, it is necessary for the hitch to be in a standard vertical position to receive the tongue of a trailer.

Heretofore, collapsible trailer hitches have been provided for trucks including dump trucks. Most such hitches are collapsed by hand. Manual operation of the hitch requires the operator to leave the cab, and since the hitches are generally sturdily built, manual operation can be dangerous. In one prior self-collapsing type hitch, the hitch ball is in a relatively high position in the nontilted position, and the lowest position thereof is lower than the lowest portion of the dump bed in the tilted position, an unsatisfactory compromise in both cases.

Summary and Objects of the Invention

The hitch of the present invention collapses automatically upon the pivoting of the platform without manipulation of levers or other release mechanisms by a person outside the truck. Another feature involves the use of doubly pivoted connecting links between a stationary Y-member and a pivoting support member whereby the hitch rotates forwardly of the truck and upwardly upon collapsing. The short length of the connecting links limits the downward movement of portions of the hitch, thereby assuring greater freedom from damaging contact with objects when dump pivoting the platform.

The principal objects of the present invention are: to provide a trailer hitch for dump trucks that collapses and restores automatically upon the pivoting of the bed of the truck; to provide such a hitch wherein the downward movement of parts thereof during tilting of the bed is limited to avoid damaging ground contact by parts of the hitch; and to provide an automatically collapsible trailer hitch for dump trucks that is of simple design, is economical to manufacture, easily installed, durable and well adapted for its intended purpose.

Other objects and advantages of this invention will become apparent from the following description taken in connection with the accompanying drawings wherein are set forth by way of illustration and example certain embodiments of this invention.

BRIEF DESCRIPTION OF THE DRAWINGS

FIG. 1 is a perspective view of a trailer hitch embodying this invention, with a portion broken away for clarity of illustration.

FIG. 2 is a fragmentary plan view of a portion of the hitch adapted for truck frame mounting.

FIG. 3 is an enlarged side elevational view of the trailer hitch mounted on a truck and in the towing position.

FIG. 4 is a side elevational view of the trailer hitch in collapsed position due to truck bed tilt.

FIG. 5 is a rear elevational view of the trailer hitch in towing position.

FIG. 6 is a front elevational view of the hitch in towing position.

FIG. 7 is an enlarged fragmentary vertical cross-sectional view of the hitch taken along line 7—7, FIG. 5, showing the draw tongue in locked, towing position.

FIG. 8 is an enlarged fragmentary cross-sectional view of a hitch support member taken on line 8—8, FIG. 6, showing the hitch draw tongue in plan.

FIG. 9 is an enlarged side elevational view of the hitch in an alternate embodiment wherein the draw tongue is not extendible.

DESCRIPTION OF THE PREFERRED EMBODIMENTS

Referring to the drawings in more detail:

The reference numeral 1, FIG. 3, generally designates a conventional automotive truck with longitudinal structural chassis members 2 having attached thereto a platform pivoting bed 3 with longitudinal structural platform beams 4, said bed pivoting around pivot pin 5. Attached to the truck 1 is an automatically collapsible trailer hitch generally designated 6 embodying the present invention. The hitch 6 includes a structural brace member 7 which is substantially Y-shaped and which is securely and rigidly attached to the chassis beams 2 such that the Y-member 7 is stationary with respect thereto.

The brace member 7 may be a one-piece Y-shaped member; as illustrated, the brace 7 comprises two end-to-end Z-shaped arms 10 having rear leg portions 11 and preferably is formed of angle iron having vertical portions or webs 12 and horizontal portions or flanges 13. The arms 10 are initially bent downwardly and inwardly to a point where the distance between the two vertical portions 12 is slightly greater than the width of a telescoping tongue 15, at which point the vertical portions 12 angle rearwardly parallel with each other and with the structural member 2.

A depending support member 16 is securely attached at an upper end to a sleeve 17 through which is placed a second sleeve or bar 18. The bar 18 is secured to spaced apart mounting brackets 19 which are attached respectively to the platform beams 4. Connecting links 22 are pivotally connected by a pin 23 at one end thereof to the legs 11 of Y-member 7 and are pivotally connected at the other end thereof by a pin 24 to two triangular flanges 25 which extend longitudinally forwardly from the support member 16. Secured between the two flanges 25 is a spacer sleeve 26 which accepts the pin 24.

At the other or lower end of the support member 16, a slot generally designated 28 is defined between the flanges 25, the slot 28 slidably receiving the tongue 15 (see FIG. 7). The top rearmost portion of the slot 28 is defined by a bottom edge 29 of support member back or wall 30. The rearmost bottom portion of a slot 28 is defined by a roller assembly 32 while the front bottom portion of slot 28 is defined by a bottom plate 33 secured to the lower portions of the triangular flanges 25. The top of slot 28 is defined by a lower edge of 34 of a mud cover 35 that is secured between the triangular flanges 25, said mud cover 35 having an upper portion 36 parallel to bottom plate 33 and an angled portion 36' which includes the lower edge 34. The sides of slot 28 are defined by the triangular flanges 25.

The roller assembly 32 is comprised of a pin 37 placed horizontally through two aligned apertures 38 that are positioned in the extreme bottom-most and rearmost portions respectively of the flanges 25. A sleeve 40 is positioned between the two flanges, and the pin 37 is received through the apertures 38 and the sleeve 40. The pin 37 is secured on one end by a head 41 and on the other end by a fastener such as a nut 42. The tongue 15 rests on the sleeve 40 which rotates on pin 37 as tongue 15 telescopes.

The tongue 15 is in the general shape of a paddle (see FIG. 8) with a wide portion 50 being rearmost. A narrow portion 51 slides into and through slot 28. Between the wide portion 50 and the narrow portion 51 is a shoulder portion including angular shoulders 53 of approximately 45 degrees which fit snugly against two similarly angled stops 54 when tongue 15 is secured for towing. The wide portion 50 has two vertical bores or apertures 56 and 57 which are spaced apart and centered on the horizontal longitudinal axis thereof. A pintle ball 58 is secured in the rear aperture 56 for attaching a trailer (not shown) to the truck 1. Aperture 57 is adapted to receive a pin 59 therein for securing the tongue 15 against sliding with respect to the flanges 25.

Pin 59 is pivotally attached at its top end to one end of a release handle 60 which pivots in an aperture 66 in one triangular flange 25 through which it extends. Attached to the other end of release handle 60 is one end of a spring 67 which, at its other end, is attached to the sleeve 17 in a position above the handle 60. In this manner, spring 67 biases the outside portion of handle 60 upwardly to urge the securing pin 59 downwardly into the aperture 57 in the tongue 15. The pin 59 displaces vertically in a sleeve 70 which is used to guide pin 59 into aperture 47. The sleeve 70 is securely fastened to a horizontal plate 69 and is coaxial with an aperture 71, through which pin 59 passes.

When the pin 59 is lifted out of the aperture 57, the tongue may be easily telescoped rearwardly and moved laterally to facilitate attachment to a trailer (not shown). Upon backing of the truck toward the trailer, the tongue locks in operational position by the pin 59 falling into its aperture 57.

When dumping begins, the bed 3, along with the upper part of support member 16, rotates downwardly through an arc about the pivoting pin 5. While this rotation is occurring, the connecting links 22 pivot at the one end around pivoting pin 23 and at the other end around pivoting pin 24. The support member 16 pivots rearwardly and upwardly around an axis defined by bar 18. As the bed 3 reaches its dumping position, the connecting links 22 have rotated to a position approximately opposite of their original position for towing and the support member 16 has rotated sufficiently such that the tongue 15 is now in a nearly vertical position, FIG. 4. The forward end of the tongue 15 fits in the void between the arms 10 and legs 11 of the Y-member 7.

The relatively short length of the connecting links 22, in cooperation with lengths and position of the Y-member 7 and the support member 16, limits the downward movement of the parts of the hitch 6 during tilting of the bed 3 such that all parts of the hitch 6 are above the level of the lower rear edge 72 (FIG. 4) of the bed 3, as shown by line 73, as the bed approaches the extreme tilted position. By this means, the hitch 6 is protected from contact with the ground or objects thereon.

In an alternate embodiment, FIG. 9, the tongue 15' does not telescope but rather is securely attached, as by welding, to appropriate surfaces of the support member 16. The automatically collapsible hitch feature functions as in the first described embodiment.

It is to be understood that while certain forms of this invention have been illustrated and described, it is not to be limited thereto except insofar as such limitations are included in the following claims.

What is claimed and desired to be secured by Letters Patent is:

1. A collapsible trailer hitch for use on a dump truck having a frame and a platform bed pivotally mounted on said frame, comprising:
   (a) A structural member rigidly secured to said frame and extending rearwardly therefrom,
   (b) a support member pivotally attached to said platform bed rearwardly of said structural member,
   (c) a connecting link pivotally attached at spaced points thereon respectively to said structural member and said support member, and
   (d) a hitch member secured to said support member and projecting rearwardly therefrom, the pivotal relationship between said structural member and said support member and said connecting link being such that said hitch member rotates downwardly, forwardly and upwardly with respect to said truck frame as said platform bed is pivoted to dump position.

2. A hitch as in claim 1 wherein:
   (a) said connecting link comprises a pair of spaced apart links, each link having opposite ends pivotally attached respectively to said structural member and said support member.

3. A hitch as in claim 1 wherein:
   (a) said hitch member includes a tongue,
   (b) said tongue is immovably attached to said support member, and
   (c) a hitch ball secured to said tongue.

4. A hitch as in claim 1 wherein:
   (a) said hitch member includes an elongated tongue slidably received in said support member, and including
   (b) means for selectively locking said tongue in a predetermined position with respect to said support member.

5. A hitch as in claim 4 wherein:
   (a) said means for selectively locking said tongue comprises a biased lever and pin.

6. A hitch as in claim 1 wherein:
   (a) said structural member includes arms extending in Y-fashion forwardly of said truck,
   (b) said arms being secured to said frame at laterally spaced apart locations, thereby providing lateral stability to said hitch.

7. A hitch as in claim 1 wherein:
   (a) said support member includes pivotal mounts spaced apart laterally on said platform bed, thereby providing lateral stability to said hitch.

8. A collapsible trailer hitch for use on a truck having a frame with a pivoting platform bed attached to said frame, comprising:
- (a) a support member having two opposing ends, a sleeve attached to one of said support member ends,
- (b) a bar extending within said sleeve and having ends projecting therebeyond in opposite directions, means securing said bar ends to said platform bed, whereby said support member is pivotable about said bar,
- (c) structural Y-shaped member comprising two arms securely attached to said frame and projecting rearwardly and downwardly therefrom,
- (d) a pair of laterally spaced connecting links, each link being pivotally connected at one end thereof to said support member and at the other end thereof to said structural member, the proportions of said members and links being such as to urge said support member forwardly and upwardly about said bar upon the pivoting of said platform bed, and
- (e) a hitch tongue mounted on said support member and movable forwardly and upwardly therewith.

* * * * *